United States Patent Office 2,933,768
Patented Apr. 26, 1960

2,933,768

IMPROVED OIL AND HEAT RESISTANT ELASTOMER FOAMED PRODUCTS AND THEIR MANUFACTURE

Harold B. Morris, Latrobe, Pa., assignor to Toyad Corporation, Latrobe, Pa., a corporation of Pennsylvania No Drawing. Application November 4, 1955
Serial No. 545,116

10 Claims. (Cl. 18—53)

This invention relates to elastomer foams and sponge and methods of making them and particularly to foam and sponge adapted to withstand the simultaneous effects of oil, high temperatures and compressive strains. There have been in the past a variety of elastomer foams and sponge proposed for a variety of uses. For example, current neoprene foam art is well developed for the preparation of cushioning materials, seals, shock absorbers and the like. In the use of these materials normal atmospheric conditions generally prevail and satisfactory service requirements are defined in terms of limited permanent set in hot air and high recovery after compression at room temperature. It has been proposed to use elastomer foam and particularly neoprene foam for lubrication fittings in which the neoprene foam acts as an oil reservoir and wick. The neoprene foam which has heretofore been available has not been satisfactory in this application. The solution to the problem of producing a satisfactory elastomer foam for such service has been complicated by the complexity of the related problems involved. An elastomer to be satisfactory for use as an oil reservoir in lubricating journals must have an affinity for the lubricant in order to insure a satisfactory feed of the lubricant to the frictional surfaces. It must be able to withstand the simultaneous action of hot oil, high temperatures and compressive strains. None of the foams and sponges made by present practice of the art can perform under these conditions.

I have discovered an elastomer foam capable of solving these problems of high temperatures, hot oil and compression failures and a method of making such a foam. I have discovered an elastomer foam and method of treating the elastomer which results in a foam having substantially complete recovery (no permanent set) after compression to about 50% of original thickness and immersion in hot lubricating oil for periods up to 8 hours at temperatures up to 300° F.

I have found that many of the oil resisting type polymers which can be foamed are suitable, to some extent, for use in my invention, e.g., Neoprene Type 60; Neoprene Type 601-A; Neoprene Type 842; Neoprene Type 842-A; Neoprene Type 571; acrylonitrile-butadiene; polyurethane, sulfide rubbers, etc. I prefer, however, to use the neoprene latex polymers such as Type 60 and Type 601-A. It is known that cellular structures can be prepared from such materials by mechanical aeration, by chemical blowing agents, expansion of dissolved gases, etc. I prefer to use mechanical aeration in the practice of my invention, however, any of the other methods of producing cellular structure may be used if desired.

I have discovered that in order to obtain the desirable properties of resistance to the simultaneous action of high temperatures, hot oil and compressive strains, the amount of acid acceptor (usually zinc oxide) must be reduced far below that used in conventional foam practice. Preferably, I use less than half of the acid acceptor conventionally used with a particular polymer. I have also found that it is desirable to reduce the amount of sulfur added to the admixture to about one-half that conventionally used. Additionally I have found that the addition of a heat stabilizer such as phenyl-beta-naphthylamine in substance amounts is advantageous. The addition of small amounts (up to 1%) of heat stabilizers has been practiced heretofore, but I have discovered that additions of about 2% of phenyl-beta-naphthylamine are desirable in order to obtain the maximum heat resistance in the foam.

The method of this invention can perhaps be most clearly explained by reference to the following example of a preferred practice.

*Example*

A neoprene latex formulation of:

| | Parts |
|---|---|
| Neoprene solids Type 60 latex | 85.0 |
| Neoprene solids Type 601-A latex | 15.0 |
| Phenyl-beta-naphthylamine | 2.0 |
| Zinc oxide | 2.0 |
| Sulphur | 1.0 |
| Petrolatum | 3.0 |
| Sodium silicofluoride | 1.0 | was admixed, frothed and cast in the manner usually followed to maintain a small pore structure. The cast foam was then heated for about 20 minutes in steam at atmospheric pressure. The semi-set material was then stripped from the mold, permitted to cool, and vulcanized for about 60 minutes at 70 p.s.i. of steam. The preliminary heating and the vulcanization step could be combined and the stripping eliminated if desired. Following vulcanization the material was washed in warm water, centrifuged and then wet-baked in steam at 70 p.s.i. for about three hours. After removal from the wet bake the molded articles were heated in a hot air drying oven for about 40 hours at 180° F. to 190° F.

The resulting pieces were tested by subjecting them to 60% compression for 4 hours in lubricating oil at 300° F. Upon removing the compression the test pieces showed no measurable compression-set.

I have found that the final wet-bake step is best carried out under steam pressures which produce a temperature in the range of the service temperature to be encountered by the part. For example, if the service temperature in hot oil will reach 250° F., then the steam pressure in the final wet-bake should be such as to produce a temperature of about 250° F.

I have also found that in the wet-bake step a certain percentage of moisture (about 10% to 50%) should be maintained in the foamed article. In the preferred practice of this invention I maintain a moisture content of between about 20% to 40% during the wet-bake step. Furthermore this wet-bake treatment must be carried out in an atmosphere substantially free of oxygen.

I preferably carry out the wet-bake step in an autoclave at steam pressures up to 70 p.s.i. for times determined by the thickness of the article. The preferred average time of treatment at this pressure is one and one-half to four hours for thickness of 1 inch to 3 inches, although times as low as about 1.25 hours per inch of thickness have produced satisfactory foams.

The foregoing methods are illustrated in the accompanying flow-sheet showing a preferred practice and an alternate practice of the method.

The theory of the changes in the elastomer foam brought on by this treatment and which produce these surprising results is not completely clear. My researches show that in cases where an elastomer such as neoprene which forms an acid constituent is used, the amount of zinc oxide, which is added, is critical. It appears that there must be an insufficient amount of acid acceptor (zinc oxide) present to combine with the acid forming constituents of the elastomer during the several heating steps. For example, common usage calls for 5% zinc oxide in neoprene formulations such as that used in the Example given above. I have found, however, that in that formulation amounts of zinc oxide in excess of 2% gives poor oil set characteristics.

While I have hereinabove described a preferred embodiment and practice of my invention, it will be understood that this invention may be otherwise embodied and practiced within the scope of the following claims.

I claim:

1. The method of preparing elastomer foam and sponge oil reservoirs, wicks and the like, comprising the steps of foaming an oil resistant elastomer in fluid form, casting the foamed elastomer in a mold, vulcanizing the cast foamed elastomer, washing the vulcanized casting, reducing the moisture content of the casting to a low percentage, wet baking the washed casting in a non-oxidizing atmosphere in the presence of not less than about 10 percent moisture at a temperature substantially equal to the temperature to be encountered in use, and drying.

2. The method of preparing elastomer foam and sponge oil reservoirs, wicks and the like, comprising the steps of foaming an oil resistant elastomer latex, casting the foamed elastomer latex in a mold, vulcanizing the cast foamed elastomer, washing the vulcanized casting, reducing the moisture content of the washed casting to about 10 percent to 50 percent, wet baking the washed casting in an atmosphere of steam substantially free of oxygen and in the presence of not less than about 10% moisture at a temperature approximately equal to the temperature to be encountered in use for a period of time equal to about 1.25 hours per inch of thickness in the casting, and drying.

3. The method of preparing neoprene foam and sponge oil reservoirs, wicks and the like, comprising the steps of foaming a neoprene latex with an amount of acid acceptor less than that necessary to combine with acids formed during processing, casting the foamed latex in a mold, vulcanizing the cast latex, washing the vulcanized casting, reducing the moisture content of the casting to about 20 percent to 40 percent, wet baking the washed casting in an atmosphere of steam substantially free of oxygen and in the presence of not less than 10% moisture at about 70 p.s.i. for a period of time equal to about 1.25 hours per inch of thickness of the casting, and drying.

4. The method of preparing neoprene foam and sponge oil reservoirs, wicks and the like, comprising the steps of admixing 100 parts of latex with about 2 parts of an acid acceptor, about 2 parts of heat stabilizer and a vulcanizing agent, casting the foamed latex in a mold, vulcanizing the cast latex, washing the vulcanized casting, reducing the moisture content of the casting to about 10 percent to 50 percent, wet baking the washed casting in an atmosphere of steam substantially free of oxygen and in the presence of not less than about 10% moisture at about 70 p.s.i. for a period of time equal to about 1.25 hours per inch of thickness of the casting, and drying.

5. The method of preparing neoprene foam and sponge oil reservoirs, wicks and the like, comprising the steps of admixing 100 parts of neoprene latex with about 2 parts of zinc oxide to serve as an acid acceptor, about 2 parts of heat stabilizer and a vulcanizing agent, casting the foamed latex in a mold, vulcanizing the cast latex, washing the vulcanized casting, reducing the moisture content of the casting to about 10 percent to 50 percent, wet baking the washed casting in an atmosphere of steam substantially free of oxygen at about 70 p.s.i. for a period of time equal to about 1½ hours to 4 hours for thickness of the casting of from about 1 inch to 3 inches, and drying.

6. A product produced by the method defined in claim 1.

7. A product produced by the method defined in claim 2.

8. A product produced by the method defined in claim 3.

9. A product produced by the method defined in claim 4.

10. A product produced by the method defined in claim 5.

References Cited in the file of this patent

UNITED STATES PATENTS

| | | |
|---|---|---|
| 97,880 | Chesterman | Dec. 14, 1869 |
| 2,231,769 | Merrill | Feb. 11, 1941 |
| 2,531,059 | Krotz | Nov. 21, 1950 |
| 2,549,144 | Truscott | Apr. 17, 1951 |
| 2,567,952 | Lewis | Sept. 18, 1951 |
| 2,665,864 | Mooney | Jan. 12, 1954 |

OTHER REFERENCES

"Latex in Industry," by R. J. Noble, second edition, 1953, pp. 292, Rubber Age, 250 West 57th Street, New York 19, N.Y. (Copy in Scientific Library.)

UNITED STATES PATENT OFFICE
CERTIFICATE OF CORRECTION

Patent No. 2,933,768                                            April 26, 1960

Harold B. Morris

It is hereby certified that error appears in the printed specification of the above numbered patent requiring correction and that the said Letters Patent should read as corrected below.

Column 2, line 39, for "60%" read -- 50% --.

Signed and sealed this 4th day of October 1960.

(SEAL)

Attest:
KARL H. AXLINE
Attesting Officer

ROBERT C. WATSON
Commissioner of Patents